United States Patent
Yue (10) Patent No.: US 9,258,378 B2
(45) Date of Patent: Feb. 9, 2016

(54) METHOD AND DEVICE FOR PUSHING INFORMATION

(71) Applicant: TENCENT TECHNOLOGY (SHENZHEN) COMPANY LIMITED, Shenzhen (CN)

(72) Inventor: Zengshu Yue, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/426,194

(22) PCT Filed: Sep. 6, 2013

(86) PCT No.: PCT/CN2013/083040
§ 371 (c)(1),
(2) Date: Mar. 5, 2015

(87) PCT Pub. No.: WO2014/040516
PCT Pub. Date: Mar. 20, 2014

(65) Prior Publication Data
US 2015/0237152 A1 Aug. 20, 2015

(30) Foreign Application Priority Data
Sep. 12, 2012 (CN) .......................... 2012 1 0336386

(51) Int. Cl.
*G06F 15/16* (2006.01)
*H04L 29/08* (2006.01)
*H04L 12/58* (2006.01)

(52) U.S. Cl.
CPC .............. *H04L 67/26* (2013.01); *H04L 51/046* (2013.01); *H04L 67/20* (2013.01)

(58) Field of Classification Search
USPC .................................. 709/200, 206, 224, 220
See application file for complete search history.

(56) References Cited

U.S. PATENT DOCUMENTS

| 2002/0087643 | A1* | 7/2002 | Parsons | G06F 9/542 709/206 |
| 2012/0215857 | A1* | 8/2012 | Bohner | G06F 19/327 709/206 |
| 2014/0335823 | A1* | 11/2014 | Heredia | H04L 12/5895 455/411 |

(Continued)

FOREIGN PATENT DOCUMENTS

| CN | 102055804 A | 5/2011 |
| CN | 102307156 A | 1/2012 |
| CN | 102780680 A | 11/2012 |

OTHER PUBLICATIONS

Search Report in International Application No. PCT/CN2013/083040 dated Dec. 19, 2013.

(Continued)

*Primary Examiner* — El Hadji Sall
(74) *Attorney, Agent, or Firm* — Marshall, Gerstein & Borun LLP (57) ABSTRACT

A method and device for sending information are disclosed in the present disclosure. The method comprises the steps of: receiving the current updated message of an information source; deriving the message which satisfies a preset condition from the current updated message; when the message satisfying the preset condition is non-subject message, deriving the user information and subject message correlated to the non-subject message from a server; and sending the information context, identification or link address corresponding to the non-subject message, the correlated user information and subject message to a third party. By sending the non-subject message satisfying a preset condition, and the user information and the subject message correlated to the non-subject message satisfying the preset condition derived from a server to a third party, the third party can know in time the correlated users, the correlated information issued by the users, and so on.

13 Claims, 3 Drawing Sheets

(56) References Cited

U.S. PATENT DOCUMENTS

2015/0006641 A1* 1/2015 Murugesan ............. H04L 51/16
709/206

OTHER PUBLICATIONS

Written Opinion (English translation), International Application No. PCT/CN2013/083040, dated Dec. 19, 2013.

* cited by examiner

FIG. 3

METHOD AND DEVICE FOR PUSHING INFORMATION

CROSS-REFERENCE TO RELATED APPLICATIONS

This application is a U.S. National Phase application under 35 U.S.C. §371 of International Application No. PCT/CN2013/083040, filed Sep. 6, 2013, entitled "Method and Device for Sending Information", which claims the priority of Chinese Patent Application No. 201210336386.4 filed Sep. 12, 2012, the entire contents of which are incorporated herein by reference.

FIELD OF THE DISCLOSURE

The present disclosure relates to network techniques, and more particularly, to a method and an apparatus for pushing information.

BACKGROUND OF THE DISCLOSURE

Information source such as microblog, blog is an open platform. It cooperates with many third parties, such as People's Daily Online, Zhejiang Online, etc. After the information source cooperates with the third party, the third party may post microblog or called microblog message, blog, etc. via the information source. A microblog user may view, comment, or forward the microblog posted by the third party, or opens a website corresponding to the third party to browse information. During this cooperation procedure, the information source acts more like a single directional bridge between the user and the third party. Microblog user information and posted microblog message may be reported to a server through the information source. However, the third party cannot know activities of the user on its corresponding website, i.e., after the user enters the website corresponding to the third party through clicking a link in the microblog posted by the third party, the third party cannot know information of the user which is active on the website. Therefore, it cannot obtain much feedback information for providing better service.

SUMMARY OF THE DISCLOSURE

Examples of the present disclosure provide a method and an apparatus for pushing information, so as to solve a problem that a third party cooperating with an information source cannot obtain information posted by a user through the information source and thereby cannot collect statistics and perform analysis to user and the information posted by the user.

According to an example of the present disclosure, a method for pushing information is provided. The method includes:

receiving currently updated messages in an information source;

obtaining a message meeting a preconfigured condition from the currently updated messages;

if the message meeting the preconfigured condition is a non-subject message, obtaining user information and a subject message which are correlated with the non-subject message from a server; and pushing contents or an identifier or a link corresponding to the non-subject message, the correlated user information and the correlated subject message to a third party.

According to another example of the present disclosure, an apparatus for pushing information is provided. The apparatus includes:

a receiving unit, to receive currently updated messages in an information source;

a first obtaining unit, to obtain a message meeting a preconfigured condition from the currently updated messages;

a second obtaining unit, to obtain, if the message meeting the preconfigured condition is a non-subject message, user information and a subject message which are correlated with the non-subject message from a server; and a transmitting unit, to push contents or an identifier or a link corresponding to the non-subject message, the correlated user information and the correlated subject message to a third party.

According to still another example of the present disclosure, a non-transitory storage medium is provided. The storage medium stores a set of instructions executable by a processor to perform a method for pushing information. The method includes:

obtaining a currently updated message in an information source;

determining whether the currently updated message is a message meeting a preconfigured condition; wherein the message meeting the preconfigured condition is a message including an identifier of a third party cooperating with the information source or is a message from the third party;

if the currently updated message is not a message meeting the preconfigured condition, discarding the currently updated message;

if the currently updated message is a message meeting the preconfigured condition, obtaining the message meeting the preconfigured condition from the currently updated message;

determining whether the message meeting the preconfigured condition is a non-subject message or a subject message; wherein if the message meeting the preconfigured condition is a non-subject message, obtaining user information and a subject message which are correlated with the non-subject message from a server, pushing contents or an identifier or a link corresponding to the non-subject message, the correlated user information and the correlated subject message to the third party;

if the message meeting the preconfigured condition is a subject message, obtaining user information correlated with the subject message, pushing the subject message and the correlated user information to the third party.

The example of the present disclosure receives the currently updated messages in an information source in real time, obtains a message meeting a preconfigured condition from the currently updated messages. If the message meeting the preconfigured condition is a non-subject message, user information and a subject message correlated with the message meeting the preconfigured condition are obtained from the server. The contents or an identifier or a link corresponding to the message meeting the preconfigured condition, the correlated user information and the correlated subject message are pushed to the third party. The problem that the third party cooperated with the information source cannot obtain information such as microblog, blog and ShuoShuo distributed by the user on the information source and therefore cannot collect statistics and analyze the information distributed by the user can be solved. The third party cooperated with the information source is able to obtain the information posted by the user via the information source. Based on this, the third party may collect statistics and analyze the information, which helps the third party to enlarge its service area.

DETAILED DESCRIPTION OF THE DISCLOSURE

The present disclosure is described hereinafter with reference to accompanying drawings and embodiments to make the technical solution and merits therein clearer. It should be noted that, the following embodiments are merely used for describing the present disclosure but are not intended to restrict the protection scope of the present disclosure.

Examples of the present disclosure obtains a non-subject message meeting a preconfigured condition in currently updated messages in an information source, and obtains user information and a subject message which are correlated with the non-subject message from a corresponding server, pushes contents or an identifier or a link corresponding to the message meeting the preconfigured condition, the correlated user information and the correlated subject message to a third party. As such, the third party is able to know the information that users focus on in time, which helps the third party to act in time and provide better service.

Hereinafter the implementation of the present disclosure is described with reference to some examples.

EXAMPLE 1

Figure 1:
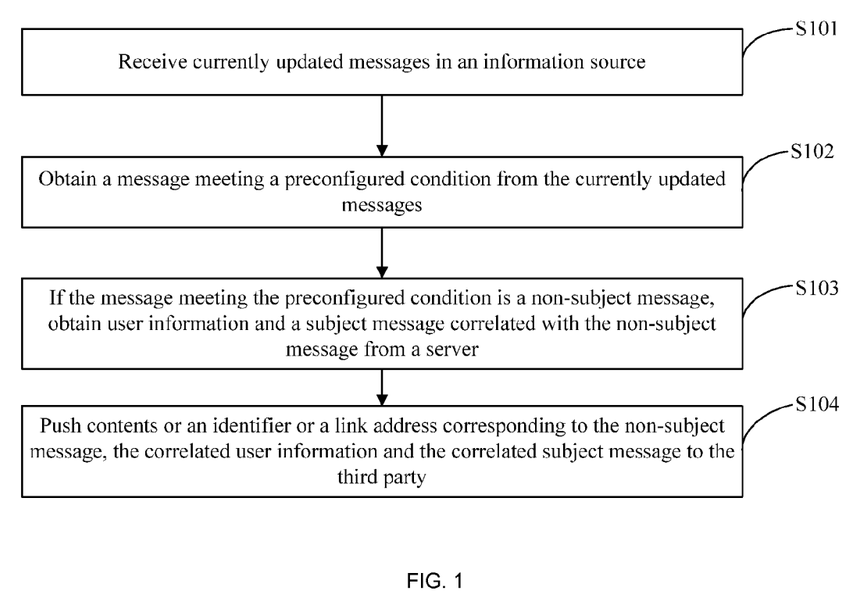
FIG. 1 shows a method for pushing information according to a first example of the present disclosure.

FIG. 1 shows a method for pushing information according to a first example of the present disclosure. As shown in FIG. 1, the method includes the following.

At block S101, currently updated messages in an information source are received.

At block S102, a message meeting a preconfigured condition is obtained from the currently updated messages.

At block S103, if the message meeting the preconfigured condition is a non-subject message, user information and a subject message correlated with the non-subject message are obtained from a server.

In a practical application, it is possible to receive all of the currently updated messages from a bus according to a defined bush protocol. In the examples of the present disclosure, microblog is taken as an example information source (but the information source is not limited to microblog information source, blog, ShuoShuo may also be the information source), thus all of the currently updated microblog messages in a current microblog may be received from the bus according to the defined bush protocol. Then the real-time updated microblog messages or referred to as data are processed, i.e., the currently updated microblog messages are analyzed and filtered and those microblog messages not meeting the preconfigured condition are discarded. The microblog message meeting the preconfigured condition may include an identifier of a third party or come from the third party. In particular, the microblog message meeting the preconfigured condition may be original (subject) microblog information posted on an information source website corresponding to the third party (hereinafter the information source website corresponding to the third party is shortened as third party website) by another microblog user, or microblog information generated through commenting or forwarding the original microblog information. The current update may be a real-time update or with a preconfigured time period, which may be configured by the user according to a practical requirement.

Further, after the microblog message meeting the preconfigured condition is obtained from the currently updated microblog messages, it is also required to retrieve various required attached information asynchronously from a cooperating microblog server. The attached information may be microblog user information or a subject microblog message relevant to the microblog message meeting the preconfigured condition. The subject microblog message refers to original microblog message (or referred to as microblog subject) posted in current microblog information source by the third party or another authorized party, not including non-subject microblog such as microblogs forwarded, commented or shared by any microblog user on the third party website. The microblog user information relevant to the microblog message meeting the preconfigured condition includes a microblog account, published personal profile, personal interest, etc.

At block S104, contents or an identifier or a link address corresponding to the non-subject message, the correlated user information and the correlated subject message are pushed to the third party.

In a practical application, operations in blocks S101, S102 and S103 may be performed in a logical layer. Thereafter, the contents corresponding to the non-subject microblog message meeting the preconfigured condition, the correlated microblog user information and the subject microblog message are pushed to the third party through a pushing layer in block S104. In particular, the pushing operation may be implemented following a preconfigured pushing protocol. For example, suppose that the third party posts a microblog with a subject W1 through microblog information source. Microblog users A and B comment the subject microblog W1. Through the above blocks, microblog contents of the subject microblog W1, user information of users A and B, and contents of the comments of users A and B with respect to the subject microblog W1 are transmitted to the third party. As such, the third party is able to get the correlated user information in time and is also able to get the microblog contents that microblog users are interested in and comment. The third party may thus obtain more feedback information from the microblog, so as to provide better service or provide advertisement more accurately to users according to the feedback information. In addition, in a practical application, it is also possible to push an identifier or a link address corresponding to the non-subject microblog message meeting the preconfigured condition, the correlated microblog user information and the correlated subject microblog message to the third party via the pushing layer. Thus after obtaining the identifier or the link address, the third party may collect statistics to relevant information according to the identifier, or obtain relevant information stored in the address through clicking the link address, so as to process the obtained relevant information. The detailed pushing manner may be configured according to a practical requirement.

In examples of the present disclosure, a message meeting a preconfigured condition is obtained from currently updated non-subject message through receiving the currently updated non-subject message in real time from an information source. User information and a subject message relevant to the non-subject message meeting the preconfigured condition are obtained from a server. The contents or an identifier or a link address corresponding to the message meeting the preconfigured condition, the relevant user information and the subject message are pushed to the third party. The example of the present disclosure solves the problem of single direction transmission of information between the information source and the cooperated open platform. Thus, a closed loop is formed for the posted information. The third party is able to receive user information of active users, posted microblogs, posted blogs on the corresponding website for subsequent analysis, so as to provide better service to the users.

EXAMPLE 2

Figure 2:
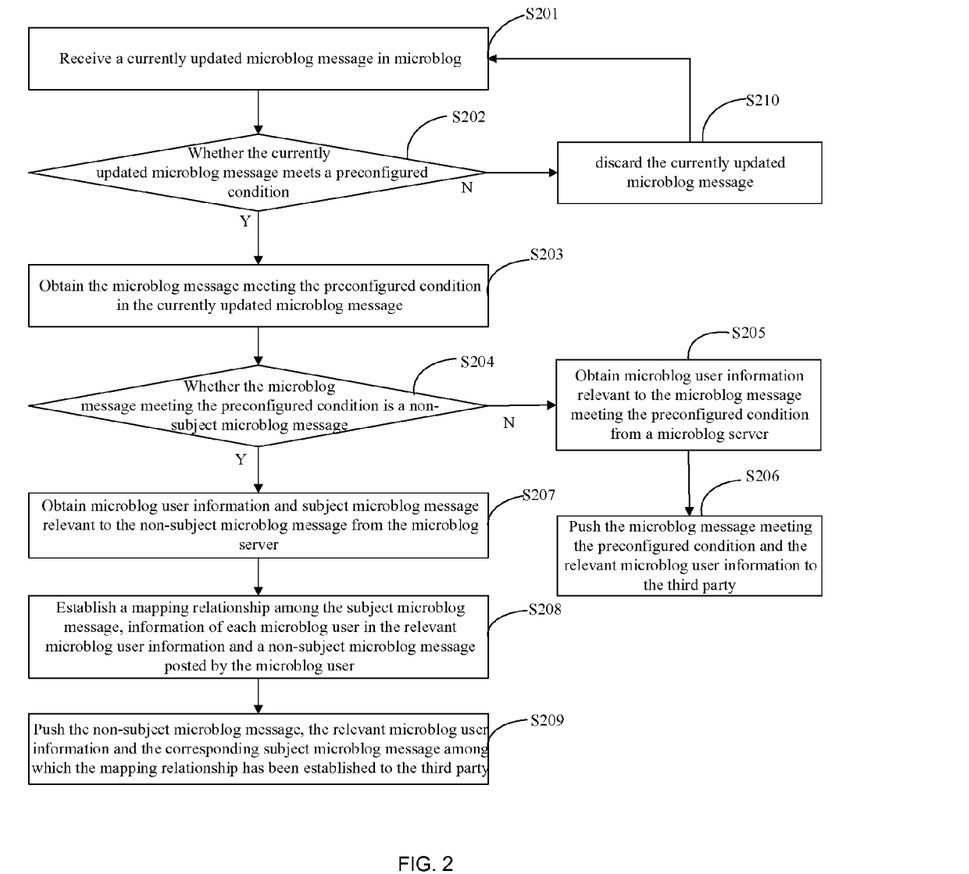
FIG. 2 shows a method for pushing information according to a second example of the present disclosure.

FIG. 2 shows a method for pushing information according to a second example of the present disclosure. As shown in FIG. 2, the method includes the following.

In the example of the present disclosure, microblog is taken as an example information source. But the information source is not limited to the microblog. The method for pushing information is described hereinafter in further detail.

At block S201, a currently updated microblog message in microblog is received.

At block S202, it is determined whether the currently updated microblog message meets a preconfigured condition; if yes, block S203 is performed; otherwise, block S210 is performed to discard the currently updated microblog message and the method returns to block S201.

The microblog message meeting the preconfigured condition may include an identifier of the third party or is from the third party. The microblog message may be a subject microblog or a non-subject microblog. For example, according to the identifier of the third party, it is determined whether the currently updated microblog message is from the third party. If it is not, the currently updated microblog message is discarded and the method returns to block S201 to keep on receiving updated microblog messages. If it is, block S203 is performed.

At block S203, the microblog message meeting the preconfigured condition in the currently updated microblog message is obtained.

At block S204, it is determined whether the microblog message meeting the preconfigured condition is a non-subject microblog message; if yes, block S207 is performed; otherwise, block S205 is performed.

At block S205, microblog user information relevant to the microblog message meeting the preconfigured condition is obtained from a microblog server.

At block S206, the microblog message meeting the preconfigured condition and the relevant microblog user information are pushed to the third party.

At block S207, microblog user information and subject microblog message relevant to the non-subject microblog message are obtained from the microblog server.

At block S208, a mapping relationship is established among the subject microblog message, information of each microblog user in the relevant microblog user information and a non-subject microblog message posted by the microblog user.

Generally, the subject microblog message includes a subject microblog identifier, and the non-subject microblog includes just an index of the corresponding subject microblog or a non-subject microblog identifier. Therefore, it is possible to determine whether the microblog message meeting the preconfigured condition includes a non-subject microblog identifier to determine whether it is a non-subject microblog message. It is also possible to determine according to a predefined identifier. The determination is not restricted herein.

In one example of the present disclosure, if it is determined in block S204 that the microblog message meeting the preconfigured condition is a subject microblog message, i.e., the currently updated microblog message is from the third party and is an original microblog message posted by the third party or another authorized party on the microblog information source, it is not necessary to retrieve the relevant subject microblog message from the microblog server corresponding to the microblog information source. It just requires retrieving the relevant microblog user information. Then the relationship between the subject microblog message and the relevant user is established. The subject microblog message and the relevant user information are pushed to the third party. The relevant user refers to a user capable of posting subject microblog on the microblog information source, e.g., the third party or another authorized user.

In another example of the present disclosure, if the currently updated microblog message is a non-subject microblog message from the third party, i.e., a microblog message posted by the third party or another user through commenting or forwarding a posted microblog message, the non-subject microblog message from the third party is obtained, and relevant microblog user information and a relevant subject microblog message are obtained from the microblog server. For example, a microblog message posted by a user through forwarding or sharing an original microblog posted by the third party is obtained, or comment of the user to a non-original microblog message existing in the third party is obtained. In addition, according to block S208, a mapping relationship is established among the subject microblog message, the information of each microblog user in the relevant microblog user information and the non-subject microblog message posted by the microblog user, i.e., the subject microblog message, the information of each microblog user in the relevant microblog user information, and the microblog message posted by the microblog user are aggregated to establish a corresponding relationship.

At block S209, the non-subject microblog message, the relevant microblog user information and the corresponding subject microblog message among which the mapping relationship has been established are pushed to the third party.

In particular, blocks S201 to S208 may be implemented in a logical layer. The information of each microblog user in the aggregated relevant microblog user information, the non-subject microblog message (meeting the preconfigured condition) posted by the microblog user and the message contents corresponding to the subject microblog message may be transmitted to the pushing layer according to a user datagram protocol (UDP). Alternatively, the information of each microblog user in the relevant microblog user information and the message contents corresponding to the subject microblog message posted by the microblog user may be transmitted to the pushing layer, and then the pushing layer pushes, after receiving the information, the received information to the third party according to block S209 or S206 following the pushing protocol.

In order to save traffic or increase push efficiency, it is also possible to store the information of each microblog user in the relevant microblog user information, the subject microblog message posted by the microblog user and the information contents corresponding to the non-subject microblog message in a particular position in advance, and transmits just a link corresponding to the information of each microblog user in the relevant microblog user information, the subject microblog message posted by the microblog user and the non-subject microblog message to the pushing layer. As such, the transmission speed and efficiency may be increased. The pushing layer transmits the link address to the third party. The third party may obtain the information stored in the particular position through clicking the received link address. In addition, it is also possible to obtain an identifier corresponding to the information of each microblog user in the relevant microblog user information, the subject microblog message posted by the microblog user and the non-subject microblog message posted by the microblog user, and transmits just the identifier to the pushing layer which pushes the identifier to the third party. As such, according to the identifier, the third party may know how many users have commented or forwarded a particular microblog message. Then the third party may collect statistics and perform some analysis operations.

In the example of the present disclosure, the microblog message pushing method may receive all of the currently updated microblog messages from the bus according to the bush protocol. If the currently updated microblog message meets the preconfigured condition, the microblog message meeting the preconfigured condition in the currently updated microblog messages is obtained. It is determined whether the microblog message meeting the preconfigured condition is a subject microblog message or a non-subject microblog message. If it is a non-subject microblog message, microblog user information and a subject microblog message correlated with the microblog message meeting the preconfigured condition may be obtained from the microblog server. Then, a mapping relationship may be established among the information of each microblog user in the relevant microblog user information, the non-subject microblog message posted by the microblog user and the corresponding subject microblog message. Then the microblog message meeting the preconfigured condition, the relevant microblog user information and the corresponding subject microblog message among which the mapping relationship are established are pushed to the third party. If it is a subject microblog message, it is possible to just obtain the relevant user information from the microblog server to avoid repeat operation and simply the operation. Finally, the third party is able to know the information of the microblog users which focus on its microblog information in time, and is also able to know which messages that the microblog users are interested in, so as to push corresponding services to the users, which improves user experiences.

Those skilled in the art would know that all or some blocks in the above examples may be implemented by program codes executed by relevant hardware. The program codes may be stored in a machine readable storage medium, such as ROM/RAM, magnetic disk, compact disk, etc.

EXAMPLE 3

Figure 3:
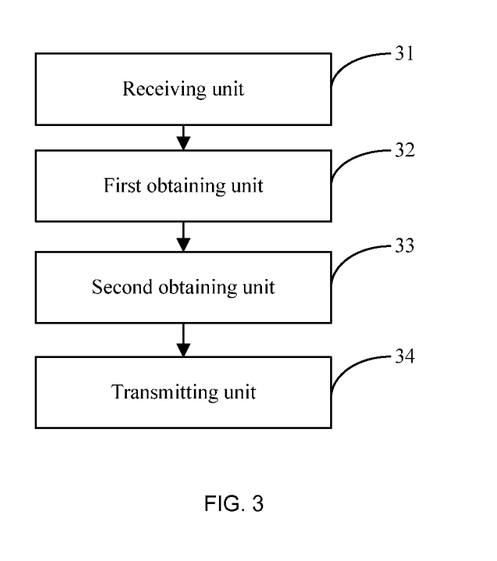
FIG. 3 shows a structure of an apparatus for pushing information according to a third example of the present disclosure.

FIG. 3 shows a structure of an information pushing apparatus according to a third example of the present disclosure. For facilitating the description, merely parts related to the example of the present disclosure are described.

The information pushing apparatus may be configured in a server. It may be a software unit running the server, or integrated in the server as an independent plug-in or running in an application system of the server. The information pushing apparatus includes a receiving unit 31, a first obtaining unit 32, a second obtaining unit 33 and a transmitting unit 34.

The receiving unit 31 receives currently updated messages in an information source.

The first receiving unit 32 obtains a message meeting a preconfigured condition in the currently updated messages.

The second obtaining unit 33 obtains, if the message meeting the preconfigured condition is a non-subject message, user information and a subject message correlated with the non-subject message from the server.

In the example of the present disclosure, after the receiving unit 31 receives from a bus a currently updated message in the information source in real time according to a predefined bush protocol, the information pushing apparatus may further include:

a determining unit, to determine whether the currently updated message meets the preconfigured condition, trigger the first obtaining unit 32 if the currently updated message meets the preconfigured condition, and discard the currently updated message if otherwise.

Suppose that the information source is microblog, the currently updated message is a microblog message, and the subject message is a subject microblog message. The message meeting the preconfigured condition is a microblog message including an identifier of the third party, or is a microblog message from the third party or is a microblog message from an information source cooperated with the third party. For example, it is an original or non-original microblog message posted by the third party via the microblog information source, or comment contents of another microblog user on an original microblog message posted by the third party website. The subject microblog message is an original microblog message posted by the third party or a relevant authorized user on the current third party website, not including forwarded, commented or shared microblogs in the third party website. The microblog user information correlated with the microblog message meeting the preconfigured condition includes account of the personal microblog, published personal profile, personal interests, etc.

The transmitting unit 34 pushes contents or an identifier or a link address corresponding to the message meeting the preconfigured condition, the relevant user information and the subject message to the third party.

In the example of the present disclosure, the receiving unit 31 receives the currently updated microblog message in the microblog. If the determining unit determines that the currently updated microblog message meets the preconfigured condition, the first obtaining unit 32 obtains the microblog message meeting the preconfigured condition in the currently updated microblog messages. The second obtaining unit 33 may further obtain from the microblog server the information of microblog user and subject microblog message correlated with the microblog message meeting the preconfigured condition. Then, the transmitting unit 34 pushes contents or an identifier or a link address corresponding to the microblog message meeting the preconfigured condition, the relevant microblog user information and the subject microblog message to the third party.

It should be noted that, if it is determined that the microblog message meeting the preconfigured condition is not non-subject microblog message, i.e., it is an original microblog message or called subject microblog message, it is not required to retrieve the subject microblog message corresponding to the microblog message meeting the preconfigured condition from the microblog server. Just the microblog user information corresponding to the subject microblog user is obtained, which facilitates the message pushing operation and may obtain the required information more rapidly.

In the example of the present disclosure, after the first obtaining unit 32 is triggered, the information pushing apparatus may further include:

a relationship establishing unit, to establish a mapping relationship among the subject message, the information of each user in the correlated user information and the non-subject message posted by the user;

at this time, the transmitting unit 34 pushes the contents or the identifier or the link address corresponding to the message meeting the preconfigured condition, the correlated user information and the subject message among which the mapping relationship has been established to the third party.

In the example of the present disclosure, suppose that the information source is microblog, the first obtaining unit 32 is able to obtain the microblog message from the third party website in the currently updated microblog messages. The second obtaining unit 33 obtains information of microblog user and subject microblog message correlated with the microblog message from the third party website, e.g., obtains microblog message posted by the third party or another user through forwarding, sharing or commenting the microblog message on the third party website. Thereafter, the relationship establishing unit establishes the mapping relationship among the subject microblog message, the information of each microblog user in the microblog user information correlated with the subject microblog message and the non-subject microblog message posted by the microblog user, i.e., aggregates the information of each microblog user in the correlated microblog user information, the microblog message posted by the microblog user and the corresponding subject microblog message to establish the corresponding relationship. The transmitting unit 34 pushes the microblog message meeting the preconfigured condition, the correlated microblog user information and the corresponding subject microblog message among which the mapping relationship has been established to the third party.

The example of the present disclosure provides an information pushing apparatus including the receiving unit 31, the first receiving unit 32, the second receiving unit 33 and the transmitting unit 34, implements pushing of the message meeting the preconfigured condition, the correlated user information and the corresponding subject message to the third party. As such, the third party may receive personal information of active users, published information, etc., so as to analyze the received data for future usage.

The example of the present disclosure receives the currently updated messages in an information source in real time, obtains a message meeting a preconfigured condition in the currently updated messages. If the message meeting the preconfigured condition is a non-subject message, user information and a subject message correlated with the message meeting the preconfigured condition are obtained from the server. The message meeting the preconfigured condition, the correlated user information and the subject message are pushed to the third party. The problem that the third party cooperated with the information source cannot obtain information such as microblog, blog and ShuoShuo posted by the user on the information source and therefore cannot collect statistics and analyze the information posted by the user can be solved. The third party cooperated with the information source is able to obtain the information posted by the user via the information source. Based on this, the third party may collect statistics and analyze the information, which helps the third party to enlarge its service area.

The method, apparatus and units provided by the present disclosure may implemented by hardware, or machine readable instructions or a combination of hardware and machine readable instructions. The machine readable instructions in the present disclosure may be stored in machine readable storage medium, such as hard disk, CD-ROM, DVD, compact disk, floppy disk, magnetic disk, RAM, ROM or other suitable storage devices. Or, at least some of the machine readable instructions may be replaced by hardware, e.g., customized integrated circuit, gate array, FPGA, PLD and a computer with a particular function, etc.

The present disclosure provides a machine readable storage medium for storing instructions executable by a system or a device to perform the method described above. In particular, the system or device provided by the present disclosure includes a storage medium, wherein the storage medium stores the machine readable instructions to realize functions of any of the above described examples. The system or device (or CPU or MCU) is able to read and execute the program codes stored in the storage medium.

In this case, the program codes read from the storage medium may realize any of the above described examples. Therefore the program codes and the storage medium storing the program codes form a part of the technical solution.

The storage medium for storing the program codes includes floppy disk, hard disk, magnetic compact disk, compact disk (such as CD-ROM, CD-R, CD-RW, DVD-ROM, DVD-RAM, DVD-RW, DVD+RW), magnetic disk, flash card, ROM, etc. In one example, the program codes may also be downloaded from a server via a communication network.

It should be noted that, for the program codes executed by the computer, at least some functions realized by the program codes may be implemented by an operating system running in the computer, so as to realize the technical solution of any example described above, wherein the computer executes instructions based on the program codes.

In addition, the program codes in the storage medium are written in a memory, wherein the memory is inserted in an extended card of the computer or is located in an extended unit connected with the computer. In one example, the CPU in the extended board or the extended unit executes at least some operations based on the program codes according to an instruction, so as to realize the technical solution of any example described above.

What has been described and illustrated herein is an example of the disclosure along with some of its variations. The terms, descriptions and figures used herein are set forth by way of illustration. Many variations are possible within the spirit and scope of the disclosure, which is intended to be defined by the following claims and their equivalents.

The invention claimed is:

1. A method for pushing information, comprising:
   receiving a currently updated message in an information source;
   obtaining a message meeting a preconfigured condition from the currently updated message;
   if the message meeting the preconfigured condition is a non-subject message, obtaining user information and a subject message which are correlated with the non-subject message from a server; and
   pushing contents or an identifier or a link address corresponding to the non-subject message, the correlated user information and the correlated subject message to a third party.

2. The method of claim 1, wherein the receiving the currently updated message in the information source comprises:
   receiving the currently updated message in the information source from a bus according to a predefined bush protocol.

3. The method of claim 1, further comprising:
   after receiving the currently updated message in the information source and before obtaining the message meeting the preconfigured condition from the currently updated message,
   determining whether the currently updated message meets the preconfigured condition;

if the currently updated message does not meet the preconfigured condition, discarding the currently updated message.

4. The method of claim 1, wherein the message meeting the preconfigured condition is a message including an identifier of the third party or is a message from the third party.

5. The method of claim 1, further comprising:
after obtaining the user information and the subject message which are correlated with the non-subject message from the server,
establishing a mapping relationship among the subject message, information of each user in the correlated user information and a non-subject message posted by the user;
the pushing the non-subject message, the correlated user information and the correlated subject message to the third party comprises:
pushing the non-subject message, the correlated user information and the subject message among which the mapping relationship is established to the third party.

6. The method of claim 1, further comprising:
if the message meeting the preconfigured condition is a subject message, obtaining user information correlated with the subject message from the server; and
pushing the subject message and the user information correlated with the subject message to the third party.

7. The method of claim 1, wherein the currently updated message is a real-time updated message or a message updated within a preconfigured time period.

8. An apparatus for pushing information, comprising:
a receiving unit, to receive a currently updated message in an information source;
a first obtaining unit, to obtain a message meeting a preconfigured condition in the currently updated message;
a second obtaining unit, to obtain, if the message meeting the preconfigured condition is a non-subject message, user information and a subject message which are correlated with the non-subject message from a server; and
a transmitting unit, to push contents or an identifier or a link address corresponding to the non-subject message, the correlated user information and the correlated subject message to a third party.

9. The apparatus of claim 8, further comprising:
a determining unit, to determine whether the currently updated message meets the preconfigured condition, trigger the first obtaining unit if the currently updated message meets the preconfigured condition, and discard the currently updated message if otherwise.

10. The apparatus of claim 8, wherein the message meeting the preconfigured condition is a message including an identifier of the third party or is a message from the third party.

11. The apparatus of claim 8, further comprising:
a relationship establishing unit, to establish a mapping relationship among the subject message, information of each user in the correlated user information and a non-subject message posted by the user.

12. A storage medium, storing machine readable instructions, wherein the machine readable instructions are executable by a processor to perform a method for pushing information, the method comprises:
obtaining a currently updated message in an information source;
determining whether the currently updated message is a message meeting a preconfigured condition; wherein the message meeting the preconfigured condition is a message including an identifier of a third party cooperating with the information source or is a message from the third party;
if the currently updated message is not a message meeting the preconfigured condition, discarding the currently updated message;
if the currently updated message is a message meeting the preconfigured condition,
obtaining the message meeting the preconfigured condition in the currently updated message;
determining whether the message meeting the preconfigured condition is a non-subject message or a subject message; wherein
if the message meeting the preconfigured condition is a non-subject message, obtaining user information and a subject message which are correlated with the non-subject message from a server, pushing contents or an identifier or a link corresponding to the non-subject message, the correlated user information and the subject message to the third party; and
if the message meeting the preconfigured condition is a subject message, obtaining user information correlated with the subject message, pushing the subject message and the correlated user information to the third party.

13. The storage medium of claim 12, wherein the information source comprises microblog, blog or ShuoShuo.

* * * * *